United States Patent [19]

Setterstrom

[11] 3,870,633

[45] Mar. 11, 1975

[54] SELF-CONTAINED TERTIARY FILTER PLANT AND CHLORINATION UNIT

[76] Inventor: William R. Setterstrom, 99 Winfield Rd., Saint Albans, W. Va. 25177

[22] Filed: Nov. 15, 1973

[21] Appl. No.: 416,218

[52] U.S. Cl. ............... 210/136, 210/199, 210/202, 210/257, 210/261, 210/265, 210/275
[51] Int. Cl. ............................................. B01d 23/16
[58] Field of Search ............... 137/209; 200/84 R; 210/104, 128, 129, 201, 202, 203, 206, 257–260, 274, 261, 262, 265, 136, 199; 302/14–16

[56] References Cited
UNITED STATES PATENTS

| | | | |
|---|---|---|---|
| 1,523,856 | 1/1925 | Best | 210/202 |
| 3,403,096 | 9/1968 | Mackrle et al. | 210/261 X |
| 3,485,749 | 12/1969 | Reilly | 210/262 X |
| 3,543,580 | 12/1970 | McGill | 200/84 R |
| 3,614,263 | 10/1971 | Witt | 137/209 X |
| 3,616,917 | 11/1971 | Hellwege | 210/262 X |
| 3,662,131 | 5/1972 | Leistiko | 200/84 R |
| 3,679,053 | 7/1972 | Koulovatos et al. | 210/104 X |
| 3,682,307 | 8/1972 | Cook et al. | 210/265 X |
| 3,696,830 | 10/1972 | Janu | 137/209 |
| 3,713,543 | 1/1973 | Heaney | 210/202 X |
| 3,717,251 | 2/1973 | Hampton | 210/104 X |

*Primary Examiner*—Samih N. Zaharna
*Assistant Examiner*—Robert H. Spitzer
*Attorney, Agent, or Firm*—Robert G. McMorrow

[57] ABSTRACT

A self-contained enclosure includes vertical and horizontal partitions defining a storage chamber for the sewage treatment plant effluent, and sand filter bed, a chlorination unit, a backwash storage chamber with check valves between chambers which are otherwise fluid connected for control of gravity flow therebetween, and air under pressure through ejectors force controlled fluid flow through the treatment chambers and backwash material return to the upstream primary sewage treatment plant.

6 Claims, 5 Drawing Figures

PATENTED MAR 11 1975 3,870,633
SHEET 1 OF 2
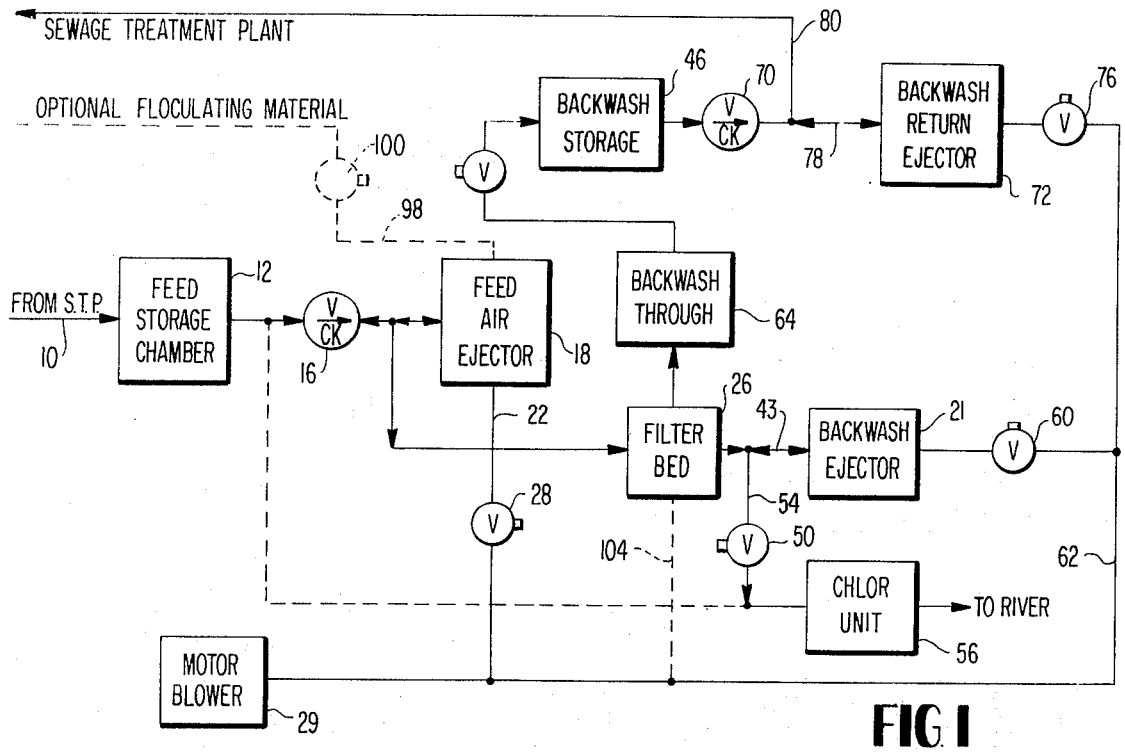
FIG. 1
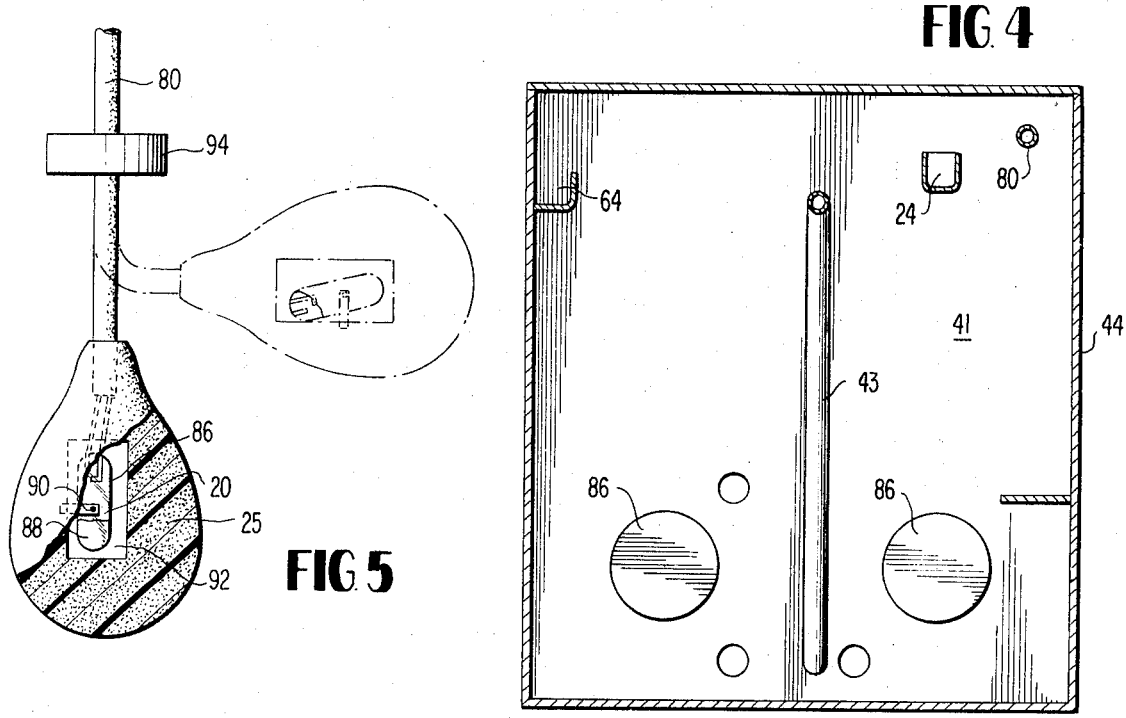
FIG. 4
FIG. 5

SELF-CONTAINED TERTIARY FILTER PLANT AND CHLORINATION UNIT

BACKGROUND OF THE INVENTION

This invention relates to tertiary filter plants and chlorination units for the secondary treatment of effluent from an aerobic sewage treatment plant and more particularly, to a self-contained unit which eliminates the need for pumps in moving the effluent between treatment chambers of the unit.

DESCRIPTION OF THE PRIOR ART

The secondary treatment of effluent from a sewage treatment plant for further removal of B.O.D. and other objectionable material through the use of sand filters employing the filtered water as the backwash material for cleaning the sand filter has been in general use for many years. Units of this type generally employ pumps and motors. To move the material through the various stages of treatment, for the removal of filtered effluent from the tertiary plant and for the return of the backwash material to the sewage treatment plant upstream, these types of units generally require complicated expensive level control equipment and they also do not generally provide for the chlorination of the filter plant effluent nor provide storage facilities necessary for the operation of the filter plant and sewage treatment plant at optimum efficiency.

SUMMARY OF THE INVENTION

This invention provides a self-contained unit which eliminates several of the objectionable features noted above and uses compressed air to move the material through the various stages for discharge as purified sewage or return of the backwash material to the sewage plant.

BRIEF DESCRIPTION OF THE DRAWING

FIG. 1 is a schematic flow diagram of the principal components of the complete, self-contained tertiary filter plant and chlorination unit of the present invention as applied to the secondary treatment of effluent from an aerobic sewage treatment plant.

FIG. 4 is a vertical sectional view of the unit taken about line 4—4 of FIG. 2.

FIG. 5 is an elevational view, partially broken away, of a float control switch forming a part of the control system of FIG. 1, showing in dotted lines a second position of the switch.

DESCRIPTION OF THE PREFERRED EMBODIMENTS

Figure 2:
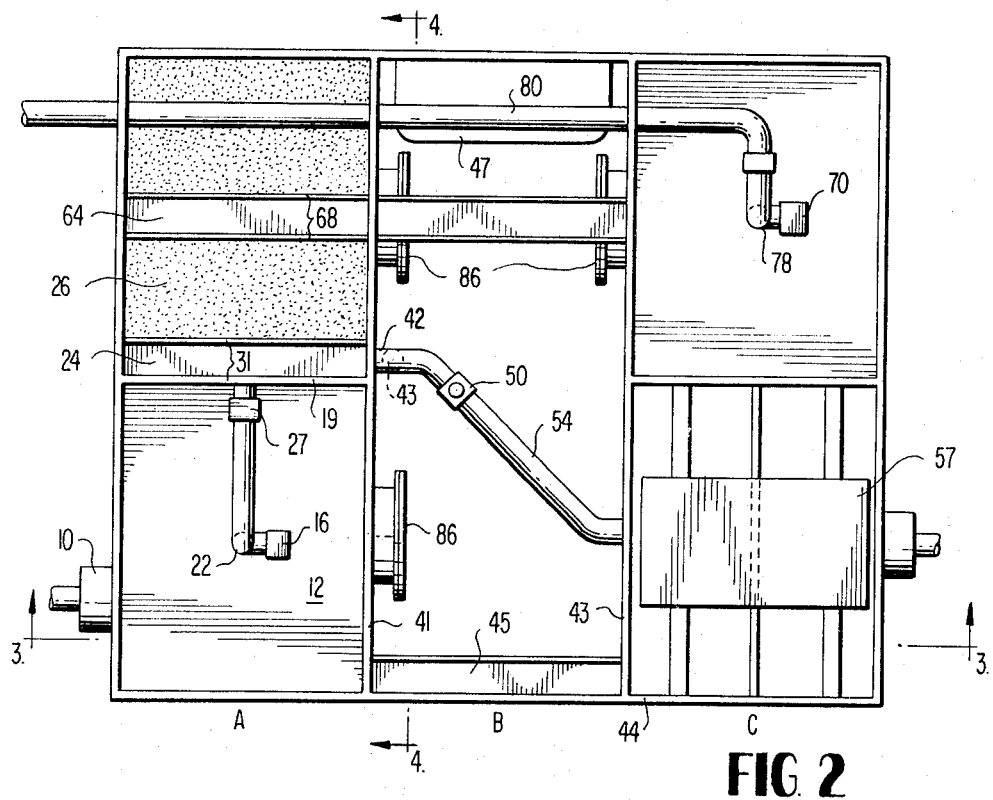
FIG. 2 is a top plan view of the tertiary unit of FIG. 1.
Figure 3:
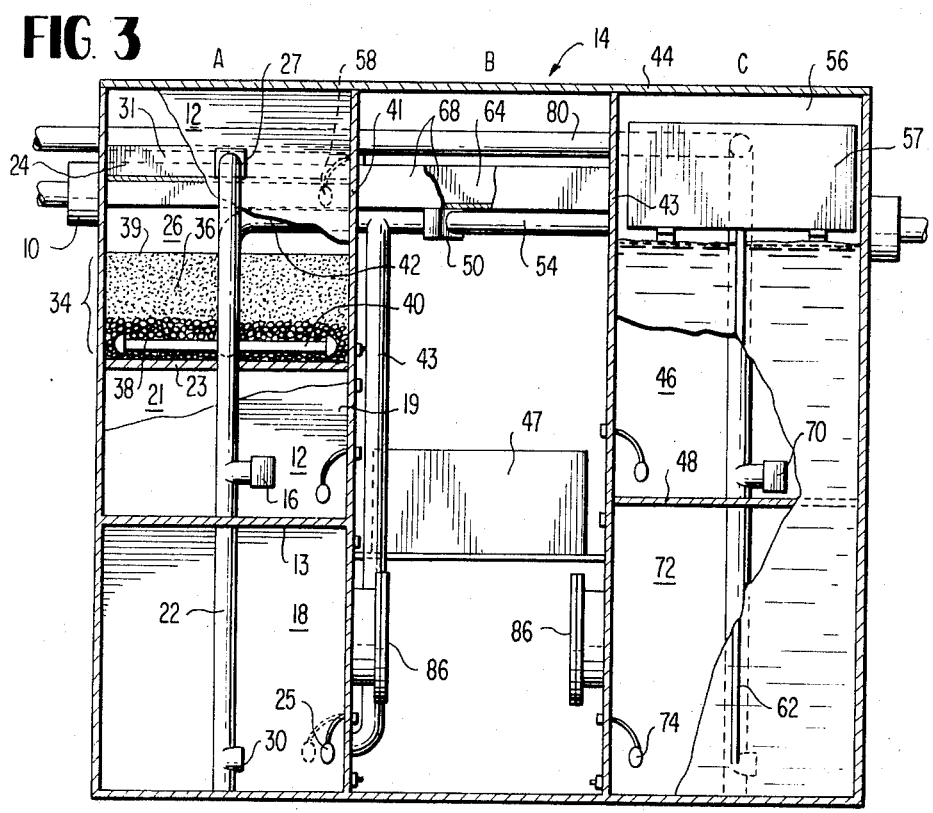
FIG. 3 is a vertical section of the unit of FIG. 2 taken about lines 3—3 and partially broken away to illustrate more clearly the chambers making up the unit.

Turning particularly to FIGS. 1, 2 and 3, the effluent from the primary sewage treatment plant (not shown) enters inlet 10 to the feed storage chamber 12 of the tertiary plant 14, the feed storage chamber 12, illustrated in FIGS. 2 and 3 as occupying the front left hand corner at the top of unit 14 and being separated by horizontal partition 13 from a feed air ejector chamber 18 which lies immediately below the feed storage chamber 12 in FIG. 2 and has a common vertical wall 19 which also partially defines both a filter bed chamber 26, and an underlying backwash ejector chamber 21 separated from the filter bed 26 by a horizontal partition 23.

From the feed storage chamber 12 of the tertiary filter plant 14, the effluent passes through a check valve 16 and enters the feed air ejector chamber 18 through air injector piping 22. These two chambers 12 and 18 provide the storage facilities to accommodate surge, increase or decrease in the flow of effluent from the sewage treatment plant. At a preset level, a mercury switch 20 more clearly seen in FIG. 5 which is encapsulated in a polyurethane control float 25 activates a control valve 28 to admit air from motor blower 29 to the feed air injector chamber 18, the air entering the pipe 22 at opening 30 which forces the feed material back out of the same line 22 through which it entered the air injector chamber, and causing it to rise to the feed trough 24 which lies above the sand filter bed section 26. The check valve 16 in the feed storage chamber 12 prevents the effluent, which rises within pipe 22, from returning to the feed storage chamber. A globe valve 27 in the air inlet line downstream of the control valve to the feed air injector chamber permits infinite adjustment in the feed rate to the sand filter section 26.

The effluent feed from the feed air injector chamber 18 overflows the feed trough 24 by rising above the ajustable weirs 31 and drops into the sand filter bed section 26 lying below the trough 24. The adjustable weir 31 on the outward side of the feed trough 24 insures even outlet flow throughout the length of the trough 24. The water filters through a bed 34 comprised of sand 36 and gravel 38 to the extent of horizontal partition 23 and the filter bed section 26 is provided with a suitable backwash piping collecting system 40 near the bottom of the filter bed 34. The filter bed 34 is installed with the gravel 38 on the bottom and the sand 36 on the top for the dual purpose of preventing the sand from entering and plugging the backwash piping 40 which may essentially consist of perforated pipe, and to permit solids collected in the sand filter portion during a normal operation to be removed during the backwashing process. The filtered water enters the backwash piping 40 near the bottom of the filter bed 30 and rises vertically through a common pipe 42 to a distance approximately 3 inches above the top 39 of the sand filter, the common pipe 42 being bent horizontally from the left hand section of the unit to the right hand section of the unit. In that respect, the unit consists essentially of an imperforate rectangular tank 44 having appropriate top bottom, side and end walls and being further provided with inner vertical walls or bulkheads 41 and 43 and defining with tank outer walls, essentially from left to right, sections A, B and C seen both in FIGS. 2 and 3. The center section B does not receive any of the water being treated but is simply a dry well section permitting access to the tanks or chambers within sections A and C to either side. It also permits the housing of the control panel 45 and blower unit 47 which houses blower 29 which supplies the ejector air. Water passes from the common pipe 42, vertically down into the backwash air ejector chamber 21 via pipe 43. This arrangement insures that there will always be a layer of liquid above the sand filter 36 to prevent the sand filter from drying out during periods of low or no flow operation and to prevent the sand immediately below the feed trough from being displaced due to the impingement of the incoming liquid. When the backwash air ejector chamber 21 becomes full, another mercury switch encapsulated in a polyurethane float activates electrically in a conventional manner a solenoid operated valve 50 to route the filtered water through pipe 54 to the chlorinator chamber 56 and chlorinator unit 57.

As the foreign material is collected in the sand filter bed 36, the pressure drop through the filter bed 26 increases and the liquid level above the sand bed rises until, at a preset level, another mercury switch encapsulated in a polyurethane float 58 is closed. Closing of this switch closes the valve 50 and the filtered water line 54 to the chlorinator chamber 56 and opens a valve 60 in the air piping 62, FIG. 1, to the backwash air ejector chamber 21 and forces by ejector action the filtered water in that chamber out through the same piping 43 through which it entered and upwards through the filter bed 34 in the opposite direction from the normal filtering operation. During the backwashing operation, the liquid level of the sand filter rises until it overflows into the fixed backwash trough 64 which is horizontally mounted above the level 39 of the sand and below the level of the feed trough 24 and causes the backwash material to feed through trough 64 across section B, through vertical partitions 41 and 43, moving from the left hand section A to the right hand section C and dumping into backwater storage chamber 46. During the backwashing process, the controls are so arranged that the inlet material fed to the filter bed section through inlet 10 is shut off to prevent recycling any inlet water directly back to the sewage treatment plant with the backwash material. Adjustable sides 68 on the backwash trough 64 in the filter bed section insures that the water enters the trough evenly on both sides throughout the length of the trough. From the backwash storage chamber 46, the backwash material passes through a check valve 70 into the backwash return air ejector chamber 72 which lies beneath backwater storage chamber 40 and is separated therefrom by horizontal partition 48. From the backwash storage chamber 46, the backwash material passes through a check valve 70 into the lower backwash air ejector chamber 72. These two chambers provide the storage capacity to permit the backwash to return to the sewage treatment plant to be adjusted to prevent surges in the inlet rate to the sewage treatment plant due to operation of the tertiary plant. At a preset level a mercury switch encapsulated in a polyurethane control float 74 closes and activates a valve 76 to emit air from blower 29 to the backwash return air ejector chamber 72 and forces the backwash material back out through the same pipe 78 through which it entered the backwash area ejector chamber 72, and then back to the sewage treatment plant via line 80. The check valve 70 prevents the backwash material from returning to the backwash storage chamber 46 as it passes in a reverse manner up through pipe 78 by ejector action leading to horizontal pipe 80 and thence to the sewage treatment plant. A gate valve in the air line to the backwash air ejector downstream of the control valve permits infinite adjustment in the rate at which the backwash material is returned to the sewage treatment plant.

The filtered water except for that required for backwashing purposes passes from the filter bed chamber 26 to the chlorination unit chamber 56. Chlorination chamber 56 is baffled to insure thorough mixing and to prevent "channeling" through the chamber from the inlet to outlet. The chamber 56 is sized to provide a minimum residence time of 60 minutes based on the rated capacity of the tertiary plant for a 24-hour period.

The center or dry well section B is included primarily for maintenance purposes but also provides the location for the controls 45, motor blower unit 47 and auxillary equipment if so desired. Manholes 86 in the sides of the air ejector chambers provide an easy means of access for periodic cleaning and any required maintenance. A dehumidifier (not shown) may be provided for the protection of the controls and the motor blower unit. A fresh water line may be supplied to this location to facilitate maintenance work, promote cleanliness and for emergency use as a backwash water supply if necessary.

A trough is provided between the inlet feed storage chamber 12 and the chlorination unit, chamber 56, physically located above the normal feed drop so that in the event it is necessary to regroup any of the other equipment from service for any reason the operation of the sewage treatment plant will not be affected and the effluent from the tertiary filter plant 14 will still pass through the chlorination unit 56.

The liquid level controls for the various chambers consist of mercury switches as at 20 which are each located at the end of a waterproof electrical cord 84. FIG. 5, the mercury switch 20 consisting of a pivotable envelope 84 housing the liquid mercury 88 and mounted for pivoting on a pivot pin at 90 within a cavity 92 of the polyurethane globe 25. The mercury 88 moves to the opposite end of the chamber of envelope 86 and spans the two normally open contacts to close the electrical circuit in conventional mercury switch fashion. Attached to the cord 84 is a lead-weight 94 which is just above the float 25 to hold the float in desired position. Adjustment of the levels and volumes of water ejected at each operation is accomplished easily by simply changing the length of cord 84 within the air ejector chamber. The switch normally is maintained in the full length position of FIG. 5, but when the level of water or effluent reaches the float 25 it shifts from a vertical axial position to a horizontal axial position closing the switch contacts by the globe of mercury 88 as seen in dotted line fashion in FIG. 5. The control valves in the air piping to the chambers and in the filter water to the chlorination unit are the "open-closed" type which may be either pneumatically or electrically operated and require no intricate or expensive controls. These control valves and the control panel for activating this same are conventional with the control panel 45 being installed in a separate weather-proof control box completely removed from the motor blower unit housing 29 to eliminate the maintenance problems encountered due to vibration when the controls in motor blowing units are enclosed in the same housing. The housing 47 for the motor blower 29 and the chlorination unit 57 within chamber 56 are constructed of fiberglas to form weather-proof uncorrosive units. The fiberglas construction of the chlorination unit eliminates the necessity of using glass or plastic container for the chlorine solution, the chlorinator being otherwise conventional, and the necessity of using a glass or plastic container for the chlorine solution. It also eliminates the damage experienced when the metal units as a result of leakage or spillage of the corrosive chlorine solution. The motor blower unit 29 is preferably mounted on rubber isolators within the fiberglas housing to reduce damage due to the vibration.

As an optional feature, the feed air injector chamber provides an excellent location for the injection of a floculating agent should this be desired. In this respect, a metered amount of floculating agent is injected via line 98 under control of valve 100, FIG. 1, to the feed air injector chamber 18 and injected into the chamber immediately prior to the time that air admission to the chamber begins. The air is admitted to the chamber through a piping distribution system located at the bottom of the chamber and passed through the water to provide the necessary agitation. After sufficient time for the flock to form, a vent valve (not shown) closes and the air pressure ejector moves the floculated waste to the feed trough in the same manner as a normal operation.

As an additional feature, there may be provided a pressurized filter chamber to increase the efficiency of the same filter as shown by dotted line 104. By relocating the filter bed, providing a top cover plate, locating a valve in the backwash trough, providing an additional access manhole and alternating the controls, air may be admitted above the filter bed to pressurize the feed material through the sand filter increasing the efficiency and reducing the operational time of tertiary filter plant.

I claim:

1. A self-contained tertiary filter plant and chlorination unit for treatment of effluent from an aerobic sewage treatment plant, said tertiary filter plant comprising a retangular unit container including imperforate top, bottom, side and end walls and provided with a pair of laterally spaced internal vertical bulkheads defining a center vertical dry well section and outer vertical liquid chamber sections to each side thereof, horizontal and vertical partitions within at least one outer section defining upper and lower feed storage and feed air ejector chambers side by side with an upper filter chamber and a lower backwash ejector chamber on one side of the center dry well section, said other outer section having means forming at least a chlorinator chamber, said filter plant and chlorination unit further including:

closable inlet means for fluid coupling the upper feed storage chamber to an upstream sewage treatment plant for receiving liquid effluent therefrom;

first pipe means fluid coupling the feed storage chamber to the underlying feed air ejector chamber;

said filter bed chamber including a filter bed positioned at a vertical height above that of said feed air ejector chamber;

a feed trough overlying said filter bed and adapted to permit effluent to overflow onto said filter bed for filtration thereof;

said chlorinator chamber including chlorine treatment means;

a discharge outlet from said chlorination chamber;

second pipe means for gathering filtered effluent from the bottom of said filter bed and rising to a level above said filter bed and extending across said center section of said unit and terminating with its discharge end opening up into said chlorination chamber for normally discharging said filtered effluent into said chlorination chamber;

a source of pressurized air;

said first pipe means having an upper end overlying said feed trough, first air ejector means carried by said first pipe means;

a check valve within said first pipe means opening up into said feed storage chamber to prevent liquid effluent from entering said pipe from said feed storage chamber but not vice-versa, said air ejector means comprising an air injection pipe fluid coupled to said air source extending within said fluid pipe means and discharging into the feed air ejector chamber for forcing effluent stored therein to flow up through the first pipe means for discharge into said feed trough;

third pipe means fluid coupling said second pipe means at a level about said filter bed directly to said lower backwash ejector chamber underlying said upper filter chamber;

whereby, filtered liquid is maintained within said lower backwash ejector chamber to the full height of the same, and within said second pipe means and said third pipe means to a level above that of said filter bed and unfiltered liquid to a level above that of said filter bed within said filter chamber;

a backwash removal trough extending horizontally across said filter chamber at a height below the feed trough and above said second pipe means and having its discharge end extending through the vertical bulkhead separating said central section from said one outer section;

said second pipe means including selectively closable valve means for shutting off flow of filtered liquid through said second pipe means to said chlorinator chamber; and said filter plant and chlorinator unit further comprises means responsive to loss of filtering capability of said filter unit to close said selectively operated valve means within said second pipe means and to terminate effluent flow into said feed storage chamber and to force liquid stored within said backwash ejector chamber to reverse flow through said third pipe means, and said second pipe means, to backwash the filter and to be removed from said filter chamber automatically when the liquid level within the filter bed chamber rises to the level of the backwash removal trough.

2. The tertiary filter plant as claimed in claim 1 wherein said feed trough has adjustable weir plate on both sides to control the overflow discharge onto said filter bed.

3. The self-contained tertiary filter plant as claimed in claim 2 wherein said filter bed comprises an upper layer of sand and a lower layer of stone.

4. The tertiary filter plant and chlorination unit as claimed in claim 1 futher comprising horizontal and vertial partition means forming upper and lower backwash storage and backwash return ejector chambers in said other outer section and to one side of said chlorinator chamber, said backwash trough extending across said center dry well section and discharging into said upper backwash storage chamber, fourth pipe means fluid connecting said backwash storage chamber with said backwash return ejector chamber and terminating at its upper end in a return line to said sewage treatment plant for treating of said backwash material, a backwash storage check valve within said fourth pipe means within said backwash storage chamber to permit backwash material to discharge from said storage chamber and flow by gravity downwardly to said backwash return ejector chamber but not vice-versa, and air ejector means within said fourth pipe means for forced return of backwash material therethrough to said return line.

5. The tertiary filter plant as claimed in claim 4 further comprising a fifth pipe means leading to said feed air ejector chamber, and means for injecting a floculating agent through such fifth pipe means and into such feed air ejector chamber.

6. The tertiary filter plant as claimed in claim 1 wherein said bulkheads defining said inner center drywell section includes manholes permitting access for cleaning the chambers of the outer sections on each side thereof from said center drywell section.

* * * * *